(12) United States Patent
Natoli et al.

(10) Patent No.: US 8,429,394 B1
(45) Date of Patent: Apr. 23, 2013

(54) RECONFIGURABLE COMPUTING SYSTEM THAT SHARES PROCESSING BETWEEN A HOST PROCESSOR AND ONE OR MORE RECONFIGURABLE HARDWARE MODULES

(75) Inventors: Vincent D. Natoli, Bel Air, MD (US); David A. Richie, Forest Hill, MD (US)

(73) Assignee: Stone Ridge Technology, Bel Air, MD (US)

( * ) Notice: Subject to any disclaimer, the term of this patent is extended or adjusted under 35 U.S.C. 154(b) by 807 days.

(21) Appl. No.: 12/403,224

(22) Filed: Mar. 12, 2009
(Under 37 CFR 1.47)

Related U.S. Application Data

(60) Provisional application No. 61/035,986, filed on Mar. 12, 2008.

(51) Int. Cl.
*G06F 1/24* (2006.01)
*G06F 9/00* (2006.01)

(52) U.S. Cl.
USPC ........................................................ 713/100

(58) Field of Classification Search .................. 713/100
See application file for complete search history.

(56) References Cited

U.S. PATENT DOCUMENTS

| 5,497,498 | A  | * | 3/1996  | Taylor ............................ 710/104 |
| 6,230,307 | B1 |   | 5/2001  | Davis et al. |
| 6,332,137 | B1 | * | 12/2001 | Hori et al. ........................ 706/15 |
| 6,658,564 | B1 |   | 12/2003 | Smith et al. |
| 6,804,589 | B2 | * | 10/2004 | Foxford et al. ............... 701/31.5 |
| 6,848,085 | B2 |   | 1/2005  | Panchul et al. |
| 6,961,841 | B2 |   | 11/2005 | Huppenthal et al. |
| 7,673,271 | B1 | * | 3/2010  | Becker et al. .................. 716/101 |
| 2005/0257186 | A1 | * | 11/2005 | Zilbershlag ...................... 716/18 |

* cited by examiner

*Primary Examiner* — Mohammed Rehman
(74) *Attorney, Agent, or Firm* — Fish & Richardson P.C.

(57) ABSTRACT

A reconfigurable computing system for enabling high performance computing includes a host platform running an operating system (OS), a reconfigurable processing kernel module, a plurality of drivers interacting with the OS, one or more reconfigurable hardware modules, and a software stack interacting with the OS and providing access to the reconfigurable hardware. The reconfigurable processing kernel module manages reconfigurable processes and coordinates data transfer to and from host. In addition, the reconfigurable processing kernel modifies the OS to utilize the software stack, thereby enabling the use of reconfigurable hardware modules through the use of hardware specific driver instructions.

33 Claims, 6 Drawing Sheets

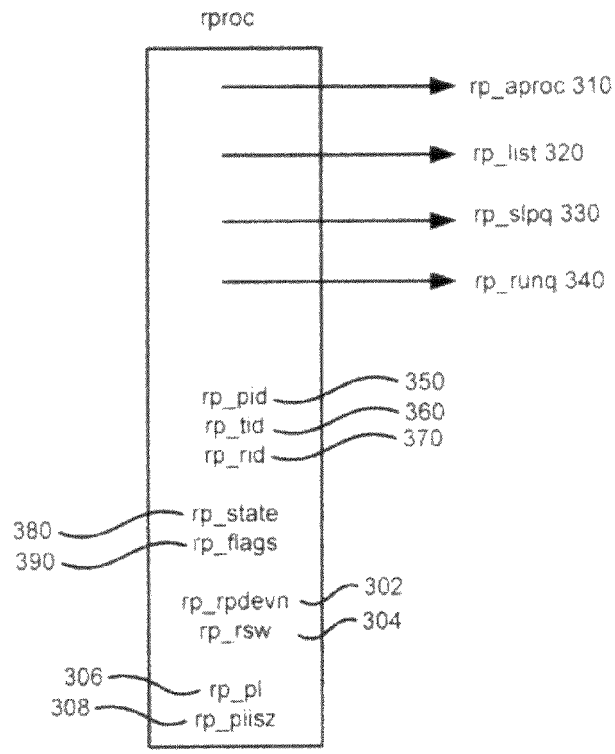

FIG. 3

| rpsysctl | Allows access to get/set kernel variables. |
|---|---|
| rpfork | Create rproc that shadows proc in host operating system |
| rpexec | Passed a binary image that is assigned to an rproc. |
| rpexit | Exit reconfigurable process. |
| rpsched | Request that an associated rproc be scheduled for execution. |
| rpswitch | Voluntarily tell RPK that the reconfigurable process may be switched out |
| rpkill | Passes signals to reconfigurable hardware that can be used to halt a hardware process |
| rpctl | Fetch, store or block on a register of rp device. Used for moving word sized data between kernel space and reconfigurable hardware. |
| rpmemcpy | Copy memory to reconfigurable hardware. |

FIG. 4

```
#pragma orp stdfpga call (a,b,&c)
{
c = a + b;
} pragma orp stdfpga call (a,b, &c)
{
c = a + b;
} pragma orp parallel for
for (i = 0, i < N, i++){
a[i] = b[i] * a[i-1]
}
```

FIG. 7

```
variable %key0, 1, 4
variable %key1, 1, 4
variable %ks, 1, 4
variable %txt0, 1, 4
variable %txt1, 1, 4
variable %X1, 1, 4
```

FIG. 8

```
mov @mc0: (%p, %i, 4), %a
mov %a, @mc1:0x4 (%p, %j, 4)
```

FIG. 9

```
{
    .parallel
        mov %txt1, %r0
        mov %txt0, %r1
}

{
    .parallel
        mul $256, %k, &t0
        add %j, &t0, &t1
        movd %dr0, @mc2 : (%S,&t1,4)
        add $2, %j
        jlt %j, $254, L6
}
```

FIG. 10

```
.bind !m, %pc0
.bind !m, @mc0
.bind @mc0, %pc0

.mtxl !m0
.mtxu !m0
```

FIG. 11

```
{
.parallel
    add %a, %b, &t0
    add %j, &t0, &t1
    mov %c, @mc0 : (%p,&t1,4)
}
```

FIG. 12

RECONFIGURABLE COMPUTING SYSTEM THAT SHARES PROCESSING BETWEEN A HOST PROCESSOR AND ONE OR MORE RECONFIGURABLE HARDWARE MODULES

CROSS-REFERENCE TO RELATED APPLICATION

This application claims priority to U.S. Provisional Patent Application Ser. No. 61/035,986 titled "Reconfigurable Computing" filed Mar. 12, 2008, which is incorporated herein by reference in its entirety.

TECHNICAL FIELD

The present application relates generally to computer architectures, hardware and software including, for example, methods and systems of computing that incorporate reconfigurable co-processing hardware elements.

BACKGROUND

As computing systems have evolved over the last 15 to 20 years they have become dominated by commodity processors designed to meet the needs of a vast consumer market. For much of that time, the industry experienced extraordinary Moore's law gains in performance, as each chip generation was nearly twice the speed of the previous. In more recent years, power dissipation and other technology constraints have become a concern, and microprocessor chip vendors have undertaken efforts to develop platforms with multiple low-power, low performance cores.

Typically, microprocessors used in general computing are programmed with a sequence of machine level commands chosen from a supported set. Programs written in high-level languages such as C or C++ are converted to machine language by other programs known as compilers. This capability allows the microprocessor to run a huge variety of different programs and algorithms.

A field programmable gate array (FPGA) is an example of a reconfigurable processing element. Generally, an FPGA's circuit is programmed into it at the time of use and may be rapidly changed as frequently as desired. An FPGA traditionally is programmed in hardware languages such as VHDL and Verilog which differ significantly from high-level languages like C or C++ that often are relied upon by developers of high performance computing applications.

SUMMARY

According to one general aspect, a reconfigurable computing system for enabling high performance computing includes a host platform running an operating system (OS), a reconfigurable processing kernel module, a plurality of drivers interacting with the OS, one or more reconfigurable hardware modules, and a software stack interacting with the OS and providing access to the reconfigurable hardware. The reconfigurable processing kernel module manages reconfigurable processes and coordinates data transfer to and from host. In addition, the reconfigurable processing kernel modifies the OS to utilize the software stack, thereby enabling the use of reconfigurable hardware modules through the use of hardware specific driver instructions.

According to another general aspect, a method for reconfigurable computing that enables high performance includes running an operating system (OS) that is located on a host platform and which is modified by a reconfigurable processing kernel module, supporting a plurality of reconfigurable hardware units through the use of one or more drivers interacting with the reconfigurable processing kernel module, accessing the reconfigurable hardware through the reconfigurable processing kernel via a software stack, and managing reconfigurable processes and coordinating data transfer to and from the host using the reconfigurable processing kernel.

In another general aspect, an operating system that enables stable management and control of reconfigurable processes includes a host operating system (OS), a reconfigurable processor kernel, and one or more device drivers. The kernel is implemented as a host OS module and the kernel, through the driver(s) supports the creation, destruction, and manipulation of reconfigurable process structures.

In yet another general aspect, a method of generating an operating system (OS) for use with reconfigurable computer hardware includes implementing a reconfigurable processor operating kernel with a host OS, and installing one or more device drivers with the reconfigurable processor kernel. The kernel is implemented as a host OS module and the kernel, through the drivers, controls reconfigurable process structures.

According to yet another general aspect, a reconfigurable processing core includes a module that enables operational mode logic, a module that enables interfacing, one or more registers, one or more memory controllers, one or more memory management units, and one or more memory controller units. The reconfigurable processing core uses operational logic to interface with system components to provide for one or more of: expanded resources, kernel processes, user processes, and resource parameterization. In addition, the reconfigurable processing core includes a finite state machine that was instantiated as part of the reconfigurable processing core after previously being specified by a user in a low level language.

In still another general aspect, a method for converting a high level language into a low level language that allows for hardware functionality on reconfigurable hardware includes compiling a high level language code into an assembly language code using a compiler, and assembling a low level language code from the assembly language code using an assembler. The assembly language and the assembler contain language and syntax constructs for specifying reconfigurable processing hardware architecture.

According to another aspect, a system for converting a high level language code to a low level language code that allows for reconfigurable hardware functionality includes a compiler to compile a high level language code into assembly language code, and an assembler to assemble the assembly language code into a low level language code. The assembly language and the assembler contain syntax and language constructs to specify architectural configuration.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program embodied in a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and the claims.

DESCRIPTION OF DRAWINGS

FIG. 3 is a diagram of a sample rproc struct object.

FIG. 4 is table of examples of system call functions.

FIGS. 7-12 are snippets of code.

DETAILED DESCRIPTION

Figure 1:
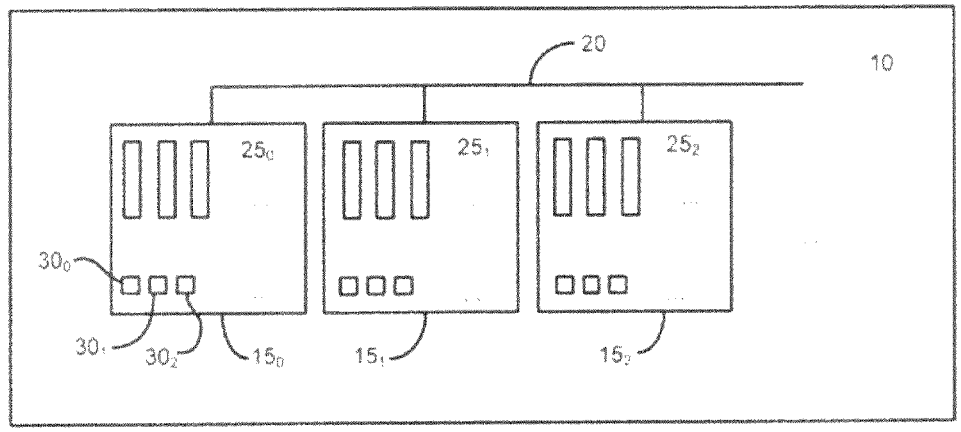
FIG. 1 is a block diagram of a reconfigurable computing architecture.

Reconfigurable computing systems share processing between a host CPU and one or more reconfigurable chips, such as, for example, one or more FPGAs. The reconfigurable chips may be configured to perform various operations at greater efficiency than a typical central processing unit because the algorithmic operations that they execute may be instantiated in hardware and they may incorporate custom parallelism and pipelining to achieve high levels of performance. For example, the reconfigurable chips may be programmed with a logic configuration that has more parallelism and pipelining characteristics than a conventional instruction processor. Furthermore, the reconfigurable chips may include large numbers of flexible, independent low level caches and multiple memory channels to transport data in and out of computational kernels. Also, each reconfigurable chip may be programmed with a custom logic configuration that is very efficient for executing the task(s) assigned to the reconfigurable chip by the program.

By running applications in hardware as opposed to software, the various implementations of the reconfigurable computing systems described herein may achieve greater processing speeds and offer better performance than typical, general purpose CPUs. Furthermore, dividing a program's processing requirements between the instruction processor and the reconfigurable chips may increase the overall processing power of the system.

Implementations of the reconfigurable computing systems described herein enable rapid sorting, categorizing, and searching of rapidly growing data stores. As such, these reconfigurable computing systems lend themselves to high performance, computation and/or data-intensive applications including, for example, bioinformatics, data search and data mining, and numerous other processes that have a large and rapidly growing role in modern information technology. Furthermore, implementations of the reconfigurable computing systems described herein provide standardized programming models, middleware, and operating system support that enable developers to effectively and practically use such reconfigurable computing systems.

For example, implementations provide operating system control over reconfigurable hardware resources. This allows for a multi-user environment and context switching of reconfigurable processes, two features that may enable implementations of the reconfigurable computing system to fit transparently into modern computing environments. In addition, implementations include one or more reconfigurable processing cores with flexible designation of registers, memory controllers, interfacing, and operational modes. These cores are configured to distill out some of the common functionality utilized by numerous different algorithms, such as, for example, memory management, flow control, and interfacing. These cores also may be configured to provide targets for an assembly compiler that translates an intermediate assembly language into a hardware descriptive language, such as, for example, VHDL, and that fuses the targeted cores and the user logic into one functional unit. Together, the above-described operating system control, reconfigurable processing cores, and the assembly compiler may operate to provide a programming environment that parallels standards and that is easily adopted by developers working in higher level languages.

Various implementations of reconfigurable computing systems are described below. For example, an integrated reconfigurable computing system with robust, easy to use and intuitive development tools that support a more standard implementation of the C language, a transparent mechanism for the transfer of data to and from the co-processing hardware, and an operating system that provides management services and allows multi-programming capability is described.

In addition, described implementations provide for a single host node comprised of one or more microprocessors and one or more reconfigurable hardware elements or a plurality of such nodes with at least one having one or more reconfigurable hardware elements. Some aspects involve an operating system optimized for supporting reconfigurable co-processing and running on a host node or nodes. Some other aspects include an assembly language configured for efficiently representing and describing programs for use on reconfigurable hardware, an assembler which converts an assembly code to a hardware descriptive language, and one or more hardware cores designed to control reconfigurable processors in an efficient manner.

In one implementation, a system is described that includes at least one operating system, one or more microprocessors with at least one attached reconfigurable hardware element. The system runs a kernel that can facilitate reconfigurable co-processing. Processes running on the system spawn co-processes on the reconfigurable hardware by requesting services from the operating system. Applications are constructed in a standard high-level language on the system and use an assembly language for the reconfigurable hardware. A compiler software toolset links the operating system and the reconfigurable hardware and can provide for automated data transfer services mediated by the operating system. One exemplary implementation can be a workstation that runs a modified freeBSD Unix kernel enabled for reconfigurable processing.

In another implementation, a system with an operating system that is configured to enable a user of the system to more easily interact with reconfigurable hardware is described. Such a system includes a host operating system modified by a reconfigurable processing kernel module and one or more hardware drivers to control communications between the operating system and the reconfigurable hardware. The operating system of this implementation provides services to the system host relating to the reconfigurable hardware and to the reconfigurable hardware relating to the host. Such services may include multi-process queuing and management, communication and data transfer, performance and profiling measurements. An example of such an operating system is a reconfigurable processing operating system (RP System). RP System may be built on the freeBSD Unix kernel and may be capable of interpreting binaries produced by a development environment and providing a multiprogramming environment for reconfigurable computing. The RP System multi-programming environment may support the use of reconfigurable hardware by one or more users and may produce and execute binary files that among others include host object code and reconfigurable binaries.

In another implementation, a system for generating programs that are configured for efficiently running on reconfigurable hardware is described. One or more systems of this implementation include an assembly language having one or more of structure, syntax, and instructions that can use features of reconfigurable hardware and an assembler which converts the assembly language into a binary image for programming reconfigurable hardware. Such a system may enable, among other things, one or more of hardware architectural specifications, expanded data storage classes, explicit multiprocessing and multithreading, instruction hybridization, resource locking and synchronization across processes or threads, or control over multiple memory channels.

An exemplary implementation includes a reconfigurable assembly language called, for example, RP Assembly and an assembler called, for example, RAS. RP Assembly may be an intermediate language between high-level languages such as C and hardware languages such as VHDL. RP assembly may allow description of some of the hardware functionality unique to reconfigurable systems such as unlimited variable registers and fine-grained pipelining and parallelism. RAS may be a computer software program that converts RP Assembly into a binary image for programming the reconfigurable hardware.

In another implementation, a system by which a computer system and its reconfigurable hardware may more easily interact with each other is disclosed that includes a pre-processing structure that can distribute commands to one or more reconfigurable and non-reconfigurable hardware elements based on efficiency. The systems of this implementation may enable synchronous parallel instruction execution, the binding of resources to specific processes or threads, or the dynamic, mutex based binding of system resource access. Such an implementation may also allow for a variety of operational logic modes, such as user, interface, kernel, or interrupt logic modes.

One exemplary aspect of this implementation includes a hardware core that resides on an FPGA intermediate between a host computer and a user application. The hardware core may provide one or more basic services to the user application similar to the services provided to host applications by a host operating system. The hardware core may be an extension of the host operating system providing access to system resources such as registers and memory and other system functions.

Compared to traditional computer systems, reconfigurable computer systems have the potential for flexibility and greater processing power, due to the presence of one or more reconfigurable processors in addition to the standard central processing unit (CPU). With reference to FIG. 1, a generalized reconfigurable computing architecture 10 is shown. The architecture 10 is comprised of N nodes numbered $15_0$ to $15_N$. The nodes are connected through an interconnect 20. Each node is comprised of one or more processors, here labeled $25_0$ to $25_M$. The processors themselves may have one or more cores. The nodes also contain zero or more reconfigurable processing elements here labeled $30_0$ to $30_L$. At least one of the nodes contains a reconfigurable element. The reconfigurable processing elements themselves contain one or more reconfigurable processing units (RPUs). Each RPU in the system can be modified to perform certain functions more efficiently than the CPU alone. Given the varying number and specialized nature of reconfigurable processing units (RPUs) present on any given reconfigurable system compared to the relatively consistent nature of traditional computer systems, the operating systems, programming languages, and system controllers designed for traditional computers may be ill-equipped for efficient work with reconfigurable systems.

In the present disclosure, systems and methods for enhancing the utility of reconfigurable computing in the field of high performance computing are described. The systems and methods use software tools and hardware cores to create and/or manage processes on RPUs in ways which enable a user to exert control over detailed aspects of functionality of the reconfigurable hardware while adhering to well understood and practiced software development methodologies. The software described in the present disclosure may include a modified operating system and associated software stack, a procedure and tool for segmentation of code, an assembly language and associated assembler and a linker, all designed to take advantage of features that may be unique to reconfigurable hardware. The hardware tools described in the present disclosure may include a hardware core architecture that is targeted by software.

In one implementation, a system that facilitates user programs to efficiently interact with reconfigurable computer hardware is described. An exemplary system of this implementation includes a host platform running an operating system (OS), a reconfigurable process kernel (RP kernel) which is implemented within the host operating system, one or more device drivers, and a software stack interacting with the OS and allowing programs, users, and the OS to access and control reconfigurable hardware. With reference to FIG. 1, each node runs a separate instantiation of such an OS with an added RP kernel module to manage the reconfigurable resources.

In another implementation, a method is described that facilitates user programs to efficiently interact with reconfigurable computer hardware. The method involves running an operating system on a host platform, implementing within the host operating system a reconfigurable process kernel (RP kernel), utilization of the OS/RP kernel on the host platform, interfacing of the OS and reconfigurable hardware using one or more devices drivers, and providing access to one or more functional attributes of the reconfigurable hardware using an OS/RP kernel software stack. The method can provide for one or more of multi-programming, multi-user, and multi-tasking environment for reconfigurable co-processes through the support of context switching and resource management.

An exemplary OS according to the present disclosure may provide mediated management and control over reconfigurable resources for users and user applications. It may allow for a multi-programming, multi-user execution environment. Certain implementations may allow the registration of a device driver to implement reconfigurable hardware-specific operations through a common interface similar to that used for conventional device drivers. Such drivers may provide hardware-specific implementations of functions that can be used to initialize, configure, communicate and release the reconfigurable hardware. A device driver may be distinct from the low-level device driver, (e.g., the PCI device driver), that supports the hardware from the host operating system perspective. An exemplary OS may also provide a mechanism for unified memory management between the host and the reconfigurable hardware. It may also have the ability to interpret single executables that contain binary images used to program the reconfigurable hardware and that control both the operation of the host and the operation of the reconfigurable hardware. Other implementations of an exemplary OS may have the ability to provide performance metrics and statistics that may be accessed by users at the command prompt.

Figure 2:
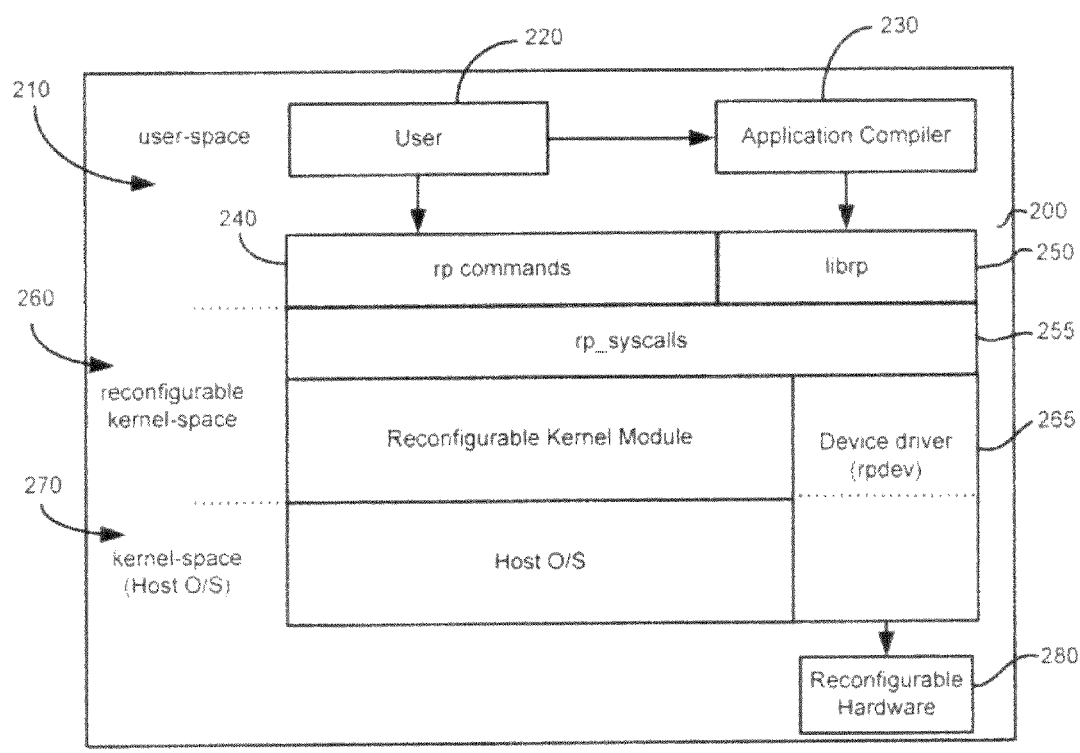
FIG. 2 is a diagram of a software stack.

With respect to FIG. 2, a representative diagram of the software stack is shown. The functionality of the Reconfigurable Kernel Module (RKM) may be coded directly into the host operating system. In one exemplary implementation, it is included as a kernel module as depicted in FIG. 2. The full interaction 200 is displayed as a set of three interacting entities, the user space entities 210, comprised of 220, 230, 240 and 250, the kernel space RKM, 260, and the kernel space host operating system 270. The RP driver labeled 265 interacts with the RKM, 260 and the host operating system. Additionally, 280 represents reconfigurable hardware which interacts with the host operating system, 270, and RKM, 260 using the devices drivers, 265. One of the purposes of the hierarchy is to provide the user interface and codes, 210, operating system mediated access to reconfigurable hardware, 280. User applications, 210, can have access to the RKM, 260, through the RP system calls 255. The RP system calls, 255, can be called directly as explicit RP commands, 230, or linked into executable code as a result of an application compiler 220 which can access RP library, 240.

A specific example of an operating system according to the present disclosure for enhanced user and program interaction with reconfigurable hardware aspects of the implementation is known as RP System and it may be used to illustrate how the components of the operating system described above may be implemented. In one implementation, RP System is a Unix compatible operating system, however, in other implementations, RP System may be compatible with the Windows Operating system, Macintosh Operating system, or various other operating systems.

In one implementation, the RKM, 260, is RP System, an extension to the FreeBSD operating system that can allow stable management and control over reconfigurable processes analogous to services provided to ordinary processes. RP System may provide a number of services that allow the efficient use of reconfigurable hardware resources. These services may include initiation, control, management and shutdown of processes on the reconfigurable hardware. RP System can register the hardware with the operating system, establish a queuing process for controlled access and support RP drivers needed to access the hardware. RP System also may handle one or more types of data communication between reconfigurable hardware and host such as large block-level transfers, register-level transfers and interrupts. RP System may control memory management across the host interface and may perform process accounting keeping metrics about the efficiency of process management and hardware usage. RP System also may read and interpret executables that are meant for execution on reconfigurable resources. RP System provides a multi-programming (multi-user, multi-task) environment for reconfigurable co-processes through the support of context switching and resource management. The main component of RP System is the kernel (rpsysk), which may be implemented as a FreeBSD-6.2 kernel module. The rpsysk kernel module may allow for the creation, management and destruction of reconfigurable process structures that are associated with parent host process structures.

The kernel module rpsysk allows the registration of RP drivers, 265, and may use the latter to implement hardware-specific operations through a common interface similar to that used for conventional device drivers. Such drivers, 255, used by RP System may provide hardware-specific implementations of functions that can be used to initialize, config-ure, communicate and/or release the reconfigurable hardware. In one implementation, the RP driver, 265, provides the functions rpdevinit, rpdevreset, rpdevshutdown, rpdevload, rpdevunload, rpdevctl, rpdevcopyin and rpdevcopyout. These functions provide device access and functionality that is of specific use to controlling reconfigurable hardware elements, 280. As a non-limiting example, the concept of loading and unloading bitstreams to the hardware is not an associated function of typical device drivers. Initialization, reset and shutdown procedures may also be significantly more complicated. Specifically, rpdevinit initializes the reconfigurable hardware device, rpdevreset resets the reconfigurable hardware, rpdevshutdown shuts down the reconfigurable hardware, rpdevload loads or configures a program image onto the reconfigurable hardware, rpdevunload unloads a program from the reconfigurable hardware, rpdevctl is used to communicate word sized blocks of information between the host and the reconfigurable hardware (such information might include things such as store, fetch, block, spin), rpdevcopyin and rpcopyout accomplish large block data transfers between the host and the reconfigurable hardware.

An RP driver can be distinct from the low-level device driver, e.g., the PCI device driver, and may require the implementation of services for which there may be no equivalent in a conventional device driver. Conventional device drivers and RP System drivers can be implemented as loadable kernel modules or built directly into the kernel and the latter can be but are not required to be separate from rpsysk itself. At the same time, the RKM and the RP drivers can be integrated even if they are implemented as two separate kernel modules. On system bootup or at the user's request, the RP System RKM is loaded. This process adds the rp_syscommands and rp_syscalls to the host operating system functionality and can register the reconfigurable hardware device drivers, RP driver, 265. One implementation may mediate control of the reconfigurable hardware through the operating system layer and may provide stable, robust, and/or scalable operation. A software stack is further built upon these system calls in the form of librp, 250, which serves a role similar to libc for conventional programming. In addition, user commands can be made available to control and monitor RP System and the processes being managed. An example is rpps which provides the status of all running reconfigurable processes similar to the standard UNIX command ps.

The rpsysk kernel module may support the creation, management, and/or destruction of reconfigurable processes through the use of rproc structures that are associated with parent host processes. The information necessary to schedule and control reconfigurable co-processes may be contained within an rproc struct. As an example, FIG. 3 shows that the rproc struct contains several pointers to lists, arrays or other data structures that contain information relevant to RP device and the RP processes. rp_aproc 310, is a pointer to a struct containing information about the associated parent host process. The rp_list, 320, is a list entry connecting the rproc struct to a list of all the rproc structs describing reconfigurable processes managed by RP System. rp_slpq, 330, and rp_rung, 340, are pointers to data objects that contain the rproc structs for all reconfigurable processes that are sleeping and running respectively. Other data elements contained in the rproc struct are the rp_pid, 350, and rp_tid, 360 which are the process id and thread id of the associated parent host process, respectively, and rp_rid, 370, which is a unique id assigned to the reconfigurable process. rp_state, 380, and rp_flags, 390, contain information about the state of the process and additional details about its condition respectively. rp_state indicates the state of the RP process which may be one of RP_SIDLE, RP_SRUN, RP_SSLEEP, RP_SSTOP, RP_SZOMBIE. rp_flags contain additional information about the condition of the RP process and may indicate the conditions RP_F_LOADED, RP_F_ACTIVE, RP_F_STOPPED, RP_F_SWITCHOK, RP_F_INTERRUPTIBLE, and RP_F_ERROR. An rproc may have only one valid rp_state but multiple valid rp_flags. Element 302, rp_devn holds the RP device number of the RP device on which the RP process is to be executed and rp_rsw, 304, is a pointer to the RP driver interface for the associated RP device. rp_pi, 306, and rp_pi-isz 308 respectively are a pointer to the binary program image for the rp process and that image's size respectively.

Interfacing to RP System from user space may be facilitated through a plurality of system calls such as rpsysctl, rpfork, rpexit, rpexec, rpsched, rpswitch, rpkill, rpctl, and rpmemcpy, however in other implementations of the system, a GUI or mixed GUI/command line entry system, or other command entry system may be used to accomplish the same results. One or more software stacks such as librp, may be further built upon these system calls which serve a role similar to that of libc for conventional programming. In addition, various commands can be made available to control and monitor RP System and the RP processes being managed, e.g., rpps, rpstat and rpkill. The functionality of each of the representative rp_syscall functions is shown in FIG. 4. With reference now to FIG. 4, these commands provided by RP System are an example of the functionality that the RKM provides to the host operating system. The RKM provides system level control and communication between the host operating system and the reconfigurable hardware in analogy to the manner in which the host operating system provides intrinsic control and communication between user space processes and kernel space processes. Additionally the present disclosure introduces the idea of user and kernel processes on the reconfigurable hardware. The distinction between kernel and user processes whether in software or hardware is one defined by privileges and access to resources.

Figure 5:
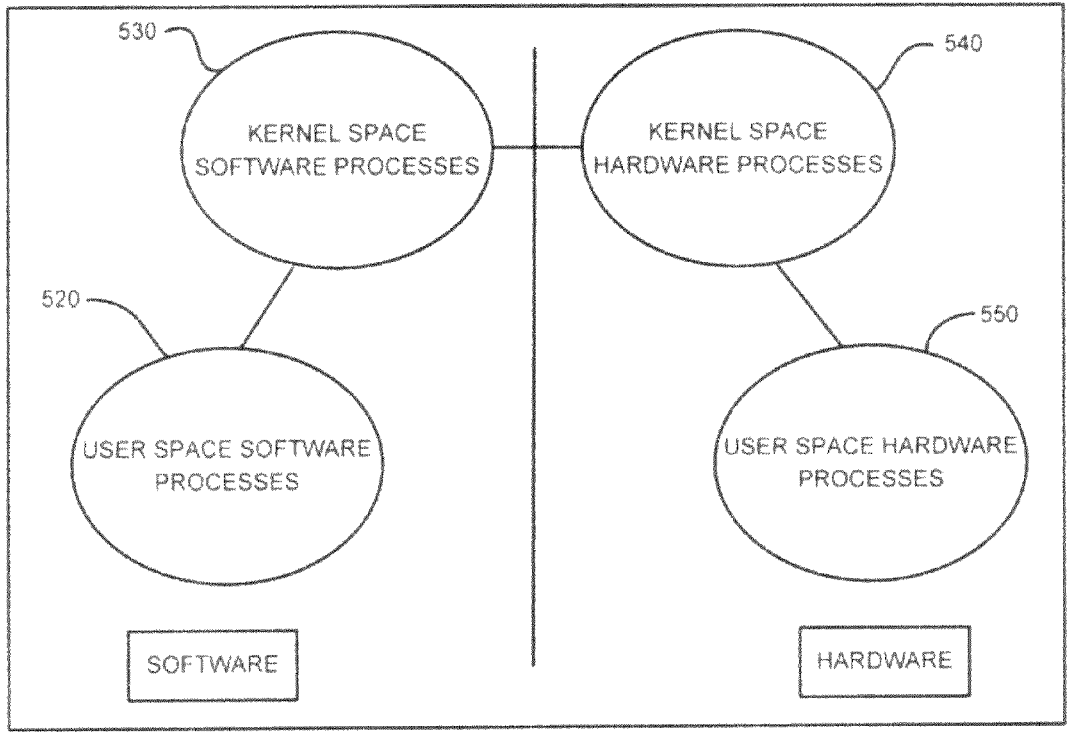
FIG. 5 is a block diagram that illustrates communication in and between software and hardware components of a reconfigurable computing system.

FIG. 5 illustrates communication in and between software and hardware components of the reconfigurable system according to one or more implementations. Kernel space software, 530 and hardware processes, 540 communicate directly with each other and each provides services to their respective user space processes. A kernel space hardware process, 540 by analogy to software has more privileges and more access to resources than user space hardware processes, 550. It manages the user space processes in a manner similar to the way the host kernel processes, 530 manage user software processes, 520.

In another implementation, a method for generating programs that can use reconfigurable hardware and that can include an application compiler is described. The method involves segmenting and translating high-level language (HLL) code to a low-level language (LLL) such as an assembly language code using a compiler, translating the assembly language code to a binary program image for the reconfigurable device, wherein the assembler and assembly language contain syntax for managing reconfigurable processing hardware and target a particular core architecture that defines the RPU.

In another implementation, a system for generating programs that can use reconfigurable hardware and that includes an application compiler is described. The system includes a complier for segmenting and translating high-level language (HLL) code to a low-level language (LLL) such as an assembly language code, an assembler for translating the assembly language code to a hardware descriptive language (HDL) code, wherein the assembler and assembly language contain syntax for managing reconfigurable processing hardware and target a particular core architecture that exists on the RPU.

Figure 6:
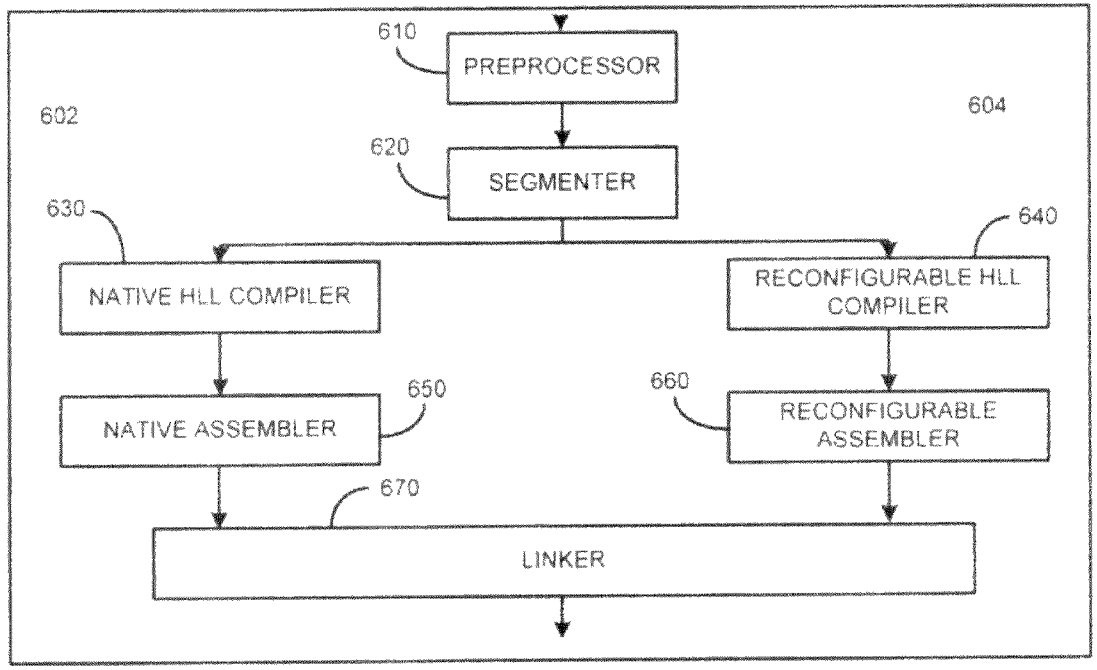
FIG. 6 is a diagram that illustrates the operation of a compiler.

A logical diagram of the operation of the application compiler, 230 from FIG. 2 is further detailed as shown in a. FIG. 6 represents the logical relation and the flow of control of the compiler tools. At the highest level there are at least two paths in the compiler. In one exemplary implementation, one path 602 operates on HLL code that targets the host CPU. The other path, 604, operates on HLL code that targets the reconfigurable resources. Processing the HLL begins with a preprocessing step, 610, and a segmenting step, 620. The preprocessing step 610 feeds into the segmenting step 620 which parses the HLL code and re-authors source for the host which is passed through the path 602 to 630 and source for the reconfigurable resource which is passed to the other path 604. The path 602 proceeds as a normal compile passing through a compilation stage 630, an assembler stage, 650 and feeding a linker 670. On the other path 604, HLL code targeting the reconfigurable resource passes through an HLL compiler, 640, that converts the HLL to a LLL which may be an assembly language. An assembler, 660, then processes the LLL and passes the result to the linker 670. The linker 670 can link both ordinary binary files targeting the host and bitstream files produced on the path 604 of processing into one single executable.

One implementation for processing a HLL to control reconfigurable hardware may include a language that allows developers and users to express the requirements for segmentation of code between host processor and reconfigurable processor. The implementation may include an application code that interprets the segmentation language in the HLL and produces two separate HLL instantiations targeting the host and the RPU respectively. The exemplary implementation may also conform to the standards of ANSI-C and allow compilation of the original HLL code including the segmentation language by standard compilers that do not target reconfigurable resources to a standard executable that runs only on the host. The application code that interprets the segmentation language may also be capable of authoring segmented HLL code that directs all required data transfer between host and reconfigurable resource through rp_system calls, making this process transparent to users. The segmenting application may also have the ability to process any number of user-designated sections of code that will target the reconfigurable hardware. The exemplary implementation may also include an assembler application that is able to take as input the LLL and convert it into a bitstream that is able to target and program the RPU. Other implementations of the system may include a compiler that converts the HLL into the LLL. Alternatively, different implementations may contain or implement one or more features described above.

One specific example is a Compiler Collection (CC). The CC may include one or more elements such as a language for the expression of host/reconfigurable hardware code segmentation (OpenRP); an application which segments code according to the OpenRP specification (rcp1); an assembly language capable of expressing the functionality of hardware core architectures on RPUs (RP Assembly); the HLL compiler which converts HLL's such as C and C++ into RP Assembly (rcc1), the reconfigurable assembler capable of converting RP Assembly into binary program images used to program reconfigurable devices (ras1); and a linker that produces a single executable in the ELF format from executable host code and bitstreams that control the operation of RPUs and which can be recognized and implemented using RP System (sld). The assembly language and assembler components may contain language and syntax to enable one or more of architectural specification, expanded data storage classes, inherent multi-processing, instruction hybridization, resource locking/synchronization across processes or threads, or support of multiple memory channels. RP Assembly discussed above is an example of an assembly language consistent with this method and system.

Considering now each of the elements in the compilation process of FIG. 6 in more detail and referring first to 620, the segmenter, which in one example is rcp1. rcp1 is capable of reading HLL source that is instrumented with a segmenting language that does not break the ANSI-C conventions. In one exemplary implementation, the OpenRP standard allows a mechanism by which programmers can designate portions of their source code that are intended to operate on reconfigurable resources. The capabilities of rcp1 can include the ability to parse HLL source code, and operate on the OpenRP standard. OpenRP commands are present in the source in the form of #pragma statements so that the HLL source may remain fully ANSI-C compliant in the absence of a reconfigurable compiler. OpenRP allows the developer to express essential information about how an application should be segmented between the host and a co-processing resource. FIG. 7 shows an example code using the OpenRP language to segment a section of code for operation on the reconfigurable resource. In the example the operation c=a+b is to be performed in hardware. The data variables a and b need to be transferred to the reconfigurable hardware and the variable c will be returned. The syntax shown in FIG. 7 implies first that the curly brace scoped section of code following the #pragma orp statement will operate in hardware. It specifies a function call to the device stdfpga. stdfgpa and any other possibilities for this argument would be defined in a file on the system which is created by an administrator when RP System is installed. There may be multiple co-processing elements in the system and the syntax allows for the selection of a particular hardware element on which to run the subsequent scope of code. The variables a, b and c in the example will be sent to the reconfigurable resource and the use of the reference symbol & for the variable c indicates that the variable c must be returned to the software process. The use of the call syntax in the example illustrates the use of an explicit call. In the second example in FIG. 7, the call syntax is left off and rcp1 is able to deduce the data that must be migrated to the board and that which must be returned from the board. In one implementation RP System employs a unified memory model in which references to data are passed by pointers and addresses and memory is transferred on demand and allocated using paging. In one implementation, this co-processing resource is a reconfigurable hardware device. The information OpenRP expresses includes which algorithm to pass to the co-processing entity, which data values specifically to pass and which will return with updated information from the co-processing entity. rcp1 has a number of capabilities related to this segmentation process. rcp1 separates code to be compiled for the CPU from code to be compiled for the co-processor. It re-authors host code to include some or all the interface functions necessary to implement the communication between the host and the co-processing device by including the appropriate rp_syscalls for programming, running, monitoring and shutdown of rp processes. rcp1 is a source to source compiler and is capable of sufficiently representing variable scope and dependency. rcp1 can interpret and process some or all OpenRP sections present in the original host code. For each section, it may produce a listing of HLL source destined for the co-processing resource. This listing may target the relevant call model for the RP device and include some or all directives, statements, commands, includes and functions as are needed to be further processed into a LLL. The call model represents the agreed upon semantic to pass arguments and control from one software entity to another. It insures safe operation through an agreed upon protocol that allows recursive branching of processes, threads and functions. FIG. 7 also illustrates the use of the #pragma orp parallel for statement which designates that the subsequent for statement should be run in parallel on the hardware. In the use of multiple embedded for loops, one may only desire to have the inner loop implemented in parallel. In one implementation this is accomplished using the parallel for syntax. The use of demand paging in the memory execution model also allows for the use of arrays and vectors whose sizes are not predetermined. In the example shown the loop extends a length of N which is a variable determined in the program.

In one implementation, the re-authored host code produced by rcp1 includes calls to functions in librp that will utilize RP System to execute the RP process on the reconfigurable device, send it required data and retrieve results. When the executing host code reaches a section that targets the reconfigurable resource, its interaction with that resource is then mediated through RP System. rcp1 may also convert the extracted HLL C or C++ code from the host source into a format that can be further operated on by the sequence of compiler tools on the right branch that produce a binary image capable of programming reconfigurable hardware. Multiple sections of code intended for the reconfigurable resource are permitted. Each is parsed separately and associated with a binary image for the reconfigurable device that is loaded by the linker stage into the final executable.

Following the segmentation phase completed by rcp1, the HLL source targeting the reconfigurable resource can be interpreted and transformed into a bitstream that embodies its algorithmic information and programs the reconfigurable resource. Typically, this process can proceed in three general stages from HLL to assembly and from assembly to HDL and from HDL to bitstream. Element 640 of FIG. 6, rcc1, is used to convert the HLL to the LLL, however, any compiler that targets RP Assembly may be substituted. rcp1 parses the source tree and rcc1 converts the HLL to RP Assembly for further processing. The separation of the hardware bitstream processing into two stages going from HLL to LLL and then LLL to HDL separates the problem of HLL to bitstream translation into two more tractable problems. The LLL to HDL process is prescriptive and proceeds mechanically translating RP Assembly commands in a unique manner into a HDL that targets a particular core architecture. The process may be very nearly a one-to-one mapping. In contrast, the HLL to LLL conversion is by nature ill-defined and there exist many different LLL sequences and translations that will accomplish the HLL algorithm. The HLL to LLL conversion is a one-to-many problem that requires optimization and attention to non-local dependency information. The separation into two stages allows one tool to focus on functionality and the second on implementation. The details of authoring the HDL are therefore hidden and separate from that of producing the best machine for accomplishing the HLL algorithm.

Assembly language and assembler components may contain language and syntax to enable one or more of architectural specification, expanded data storage classes, inherent explicit multi-processing, instruction hybridization, resource locking/synchronization across processes or threads, or support of multiple memory channels. RP Assembly is an example implementation of an assembly language consistent with this method and system.

In one implementation of the RP Assembly, for example, a given set of registers are generally assumed to exist, in analogy to for example, % eax, % eab, % eac, etc., on an x86 microprocessor. The configurability of an RPU makes it convenient to allow register declaration in assembly analogous to the declaration of storage in conventional C. Other examples of architectural elements that are motivated by the configurability of RPUs may include the declaration of hardware mutexes, the static configuration of memory channels (binding, behavior model) and static resource binding, e.g., to a process, thread or mutex. Some or all of these exhibit a C-like declaration/definition semantic not found in conventional assembly code. These types of modifications can produce a more generalized language for programming processors of more than one kind.

Additionally, an RPU can allow data storage classes not found in conventional processors, and an exemplary implementation of the assembly language may provide for language and syntax for handling such classes. As an example, a local word-sized register-like data object can be instantiated arbitrarily within the logic of an RPU and used by a local processing element. Such a data object may not have an equivalent in a conventional processor and for the purposes of the present disclosure, the term "variable" may be used to refer to them. Such objects may be differentiated from registers where the latter may be restricted to objects that are externally accessible and fixed within an RPU core architecture. Variables may require a new syntax for specification and reference as the target of instructions, and the RP Assembly implementation, among many other potential implementations, provides such syntax. FIG. 8 show examples of the use of the .variable syntax. The first line, .variable % key0,1,4 is interpreted as the creation of a register named key0 that is 4 bytes wide. The syntax .variable % key0 without additional arguments may be used to imply the use of default values of the additional arguments.

In another implementation, the assembly language may also provide programming language/syntax features to extend the conventional memory access syntax to allow for the specification of a memory channel. The specification of memory channels is useful since unlike a typical CPU which has a single memory channel exposed to direct access from the programmer, the memory architecture of an RPU may possess significant multiplicity of directly accessible channels. As an example, the access to memory for an RPU core architecture may allow for 4 independent banks of physical memory that fan out to a greater number of channels with dedicated caching. In the RP Assembly implementation the syntax to describe this particular memory channel arrangement may be, MC: OFFSET(BASE,INDEX,STRIDE) where a memory channel specification is added in a manner similar to the segment specification for certain CPUs. Different language or syntax forms also may be used. FIG. 9 gives an example of the use of the memory channel feature. In the first example the contents of memory channel 0 at address given by % p+4*% i are moved to register % a. In the second example the contents of register % a are moved into memory channel 1 at 0x4+% p+4*% j.

A reconfigurable computing system may have a multitude of processors performing a variety of functions, increasing the potential multi-tasking and multi-threading capacities of the system. An assembly language implementation can provide syntax for specifying multiple process and thread execution flows within a single text section of a process using directives, such as the ".process" and ".thread" directives found in the RP Assembly example. Each process or thread has a dedicated program counter and the latter may be referenced as a register and used to identify processes and threads in resource binding and inter-process/thread interactions. An example of this can be seen in the RP Assembly implementation, exect instruction, whereby a controlling process is able to perform a non-blocking call to a child thread. The explicit syntax is exect FOO,% tpc where FOO is the conventional entry point of the thread function and % tpc specifies which thread execution flow is being called. Other implementations may use different language or syntax forms, or may use none at all.

The architecture of an RPU may also allow fine-grained parallelism through the concurrent execution of multiple instructions. For example, an RPU core architecture may allow for up to 16 instructions per process execution flow to be executed concurrently. In the RP Assembly example, the .parallel syntax is used to specify concurrently executing directives. FIG. 10 shows two examples of the use of the .parallel directive. In the first, two independent .mov operations are completed at the same time. In the second a .mul, .add, .movd, .add and .jlt operation are all completed in parallel. The ability to specify parallel execution of instructions provides direct programmer access to one of the key advantages of reconfigurable computing.

With the concurrent execution of parallel processes and threads there may be a need for locking and synchronization. Therefore, language extensions may be made for the explicit specification of hardware mutexes (mutually exclusive locks). In the RP Assembly implementation, instructions are provided for process execution flows to acquire (mtxl) and release (mtxu) a mutex to which any number of resources (registers, memory channels, variables) may be bound. The language and syntax form for accomplishing this may change from implementation to implementation to achieve the same outcome. These features of the assembly language implementations may result in the dynamic binding of the associated resources allowing precise locking and synchronization. The use of the hardware mutex is illustrated with FIG. 11. In the example, the syntax .bind is used to bind specific system resources to a particular process or thread. In the use of the hardware mutex !m for example, the mutex is bound to the process % pc0 and memory channel 0. % pc0 is bound to memory channel 0. To initiate a lock on the mutex the syntax .mtxl !mt is employed. The mutex is unlocked with .mtxu. The programmer may be responsible for initiating a mutex lock by a process or a thread when that is necessary to prevent resource contention. Other implementations may use a different mechanism for locking resources between contending threads and processes.

Other features in one or more implementations concerning the Assembly language may include instructions that take three arguments, composite conditional branching and sub-instruction temporary values. These have been introduced mainly for convenience, clarity and efficiency. An example of a three argument function is .add % a, % b, % c, which adds the contents of register a to the contents of register b and enters the result in register c. Composite conditional branching is illustrated by the statement .jlt % i, $6,.L0, which branches to .L0 if the contents of register i are less than the decimal value 6. FIG. 12 illustrates the use of sub-instruction temporary values. The temporary values are designated through the use of the ampersand & character and may be thought of as "wires" that connect one instruction to another in a manner that allows them to be executed combinatorially in parallel. In the example, the contents of registers a and b are added and the result is referenced as &t0. Reference &t0 is then added to the contents of register p and the result is referenced as &t1. Finally a mov operation is completed which takes the contents of register c and places it in the address % p+&t1*4 in memory channel 0.

In another implementation, a system which includes a hardware core architecture to enable reconfigurable hardware to interact with a host computer system is described. Such a system may include hardware cores comprising a module to enable operational mode logic, a module to enable host interfacing, one or more registers, one or more memory controllers, one or more memory management units, and/or one or more memory control units. Implementations of this aspect of the disclosure may enable such operational modes as user, interface, kernel, or interrupt mode among others. Implementations of this aspect of the present disclosure may also allow for a single privileged process and multiple user processes, synchronous parallel instruction execution, the binding of resources to processes or threads, or dynamic mutex-based binding of system resource access. Within the reconfigurable processing systems of one or more aspects of the present disclosure, the sub-board level co-processing architecture is organized into reconfigurable devices and supporting resources such as onboard memory, interconnects and links. The RP Core architecture of one or more implementations are developed to provide for the reconfigurable construction of custom processing elements (RPUs) based on building blocks of a computer architecture. The RP Core architecture described here may allow a flexible, dynamic architecture that includes building block elements such as kernel and user processing threads, memory channels and cache hierarchy. Each RPU model/design may include base logic for interfacing and resource management and access control upon which multiple kernel and user processes can be instantiated in the form of multiple processing cores with specific capabilities. Processing cores may be programmed and instantiated using the RP Assembly language.

Each RPU can be a hybridization of the conventional concepts of a processing unit and executable code. The RPU base logic may be fixed by the particular model/design selected. Furthermore, a typical application programmer may use but not modify kernel processes that will be embedded along with the application-specific processes instantiated as user process cores. Advanced "kernel level" programming can be performed using the same RP Assembly language used for application programming. Within the reconfigurable processing system architecture described above, an RPU can be viewed as a programmable computer architecture embedded in a single chip and performing the function of a custom processor.

Figure 13:
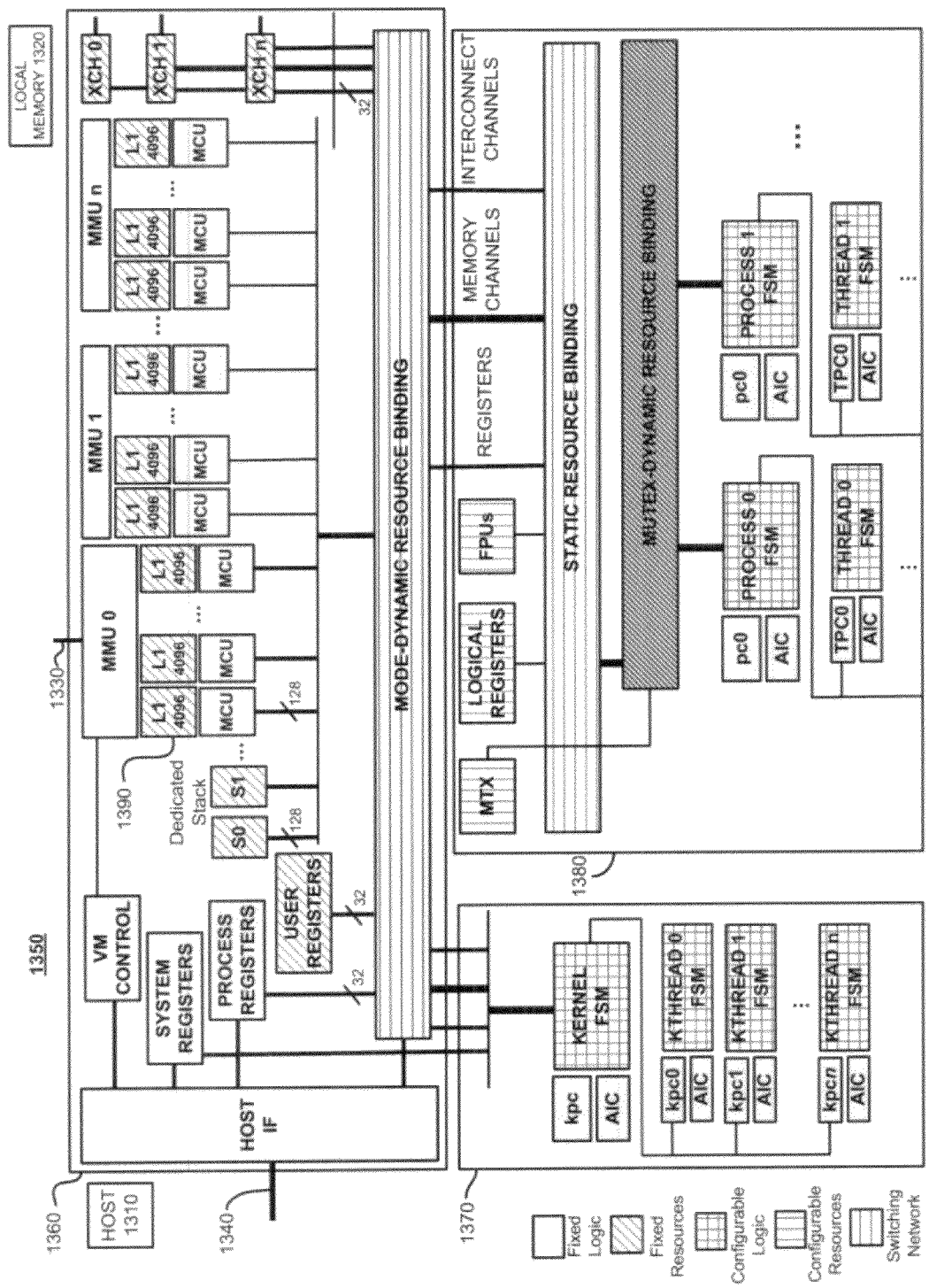
FIG. 13 is a block diagram of a reconfigurable computing system.

One implementation of this aspect of the present disclosure is the "F152N". FIG. 13 shows a block diagram of the F152N RPU architecture and its environment. The host, 1310 and local off-chip memory, 1320, interact with the RPU, 1350, through the link and interface 1330 and 1340. The F152N RPU architecture itself can be broadly separated into the base architecture, 1360, kernel and user processes, 1370 and 1380, and local cache, 1390. The F152N can allow for operation in a plurality of modes: interface (ifmode), kernel (kmode), user (umode) and interrupt (imode). The operational mode controls the access to resources and other behavioral characteristics of the RPU. The operational mode itself may be controlled by the kernel process core (kproc), 1370. In interface mode (ifmode), the host system may have complete memory mapped access and control of most RPU resources. In kernel mode (kmode) the kernel processing core may have control and access to almost all resources and therefore act in a privileged mode of operation. In user mode (umode) the kernel processing core may voluntarily grant access to certain resources so that the user application may be executed. Interrupt mode (imode) may be used to force servicing of either an externally generated interrupt (host to RPU) or an internally generated interrupt (RPU to host); access control may be modified accordingly to allow interrupt handlers to perform the required operations.

In some implementations, the system registers may be defined as word-sized storage elements that are both accessible externally through the memory mapped host interface and persistently available on every clock throughout the RPU via a register bus exported to processing cores. In a specific exemplary implementation, registers can be divided into at least three categories: system registers (SREG), process registers (PREG) and user registers (REG). Systems registers store information related to the operation of the RPU and are accessible through the host interface, 1340 and to kernel processes, 1370. Process registers are accessible through the host interface and available to kernel processes. User registers can be generic, accessible through the host interface and available to both user and kernel processes. They may be used in the same way that the registers % eax, % ebx, etc. are employed in an x86 microprocessor.

In some implementations, the memory access may be provided to reconfigurable processing cores through the introduction of memory channels. Each memory channel may provide access from a processing core to a dedicated memory-caching unit (MCU). Interfacing mirrors the OFFSET(BASE, INDEX, SCALE) model used in conventional assembly programming; with these four elements specified, along with signals to control data direction and synchronization, e.g., read/write, busy/ready, etc., a processing core is able to access data stored in memory. Each MCU itself may provide a dedicated local cache and operate similarly to the local cache of a conventional processor. In the F152N example, cache storage is of 4096 bytes in size and is implemented on Xilinx FPGA hardware using the on-chip BlockSelect memory (BRAM). The MCU can perform pagein/pageout operations as needed in response to cache misses and data modification (through a 128-bit data channel in the F152N implementation, for example). In-cache data may be accessed synchronously and at a rate determined by the underlying FPGA and therefore the use of an RPU-local cache generally results in no loss of performance but in fact may bring some of the benefits found in the local cache of a conventional processor.

A difference between some conventional processors and the RPUs described here according to some implementations can be that in reconfigurable systems with hardware cores, multiple memory channels may be provided to processing cores enabling significant parallelism for memory operations. Furthermore, multiple MCUs can be tied together by memory management units (MMU) that reconcile potential contention over the physical memory bank to which they are associated; contention may be mitigated by the programmer through the use of cache optimized algorithms. Memory access patterns from multiple memory channels may be synchronized so as to produce repeated race/contention situations. By granting access to one and stalling others, it is likely that subsequent access will be staggered.

In some implementations, the hardware processing cores may be attached to the RPU Base interface through various busses with which the Base exports resources. Each processing core has access to registers (reg_bus), memory channels (mch_bus), core-to-core and chip-to-chip links (link_bus) and interconnects (io_bus). In addition, system control signaling may be exported as appropriate for either kernel or user processing cores. The processing cores may be directly specified for instantiation and programming through RP Assembly or other assembly language implementations of the enhanced programming system described above.

As an exemplary implementation, the RP Core architecture of the F152N includes synchronous parallel instruction execution with an 8-bit program counter, up to 16-way instruction concurrency per process/thread, program counter control with conditional branching, 8 32-bit user registers, up to 32-way concurrent threading per core, 4 memory channels per core, an arbitrary number of 32-bit local registers (variables) per core, an arbitrary number of 2-way mutex for locking and synchronization, static binding of resources to processes or threads, and dynamic mutex-based binding for shared resource access. Although these are the specifications of a single example of the hardware core it will appear obvious to those skilled in the art that other such specifications are possible within the scope of a hardware core implementation, such as (by way of example and not limitation) altered register size, number of memory channels, and amount of process concurrency, etc.

According to the present disclosure, a hardware core may be implemented as synchronous finite state machines (FSM) locked to 8-bit program counters. Each process or thread may be driven by a dedicated program counter and the latter may be referenced as a register and used to reference or differentiate processes and threads within a programming model. The execution model supports conditional branching, looping and pipelining. Asynchronous instruction control (AIC) logic may be used to guarantee the correctness of both source data dependency and target data modification during parallelized instruction execution. In the F152N example, up to 16 instructions can be executed simultaneously for a given process or thread. Memory access may be provided through a memory channel bus exported from the RPU Base, the utilization of memory channels is discussed above.

Using a hardware core implementation of this aspect of the disclosure, it is possible to specify entry points into the operation of a given process or thread. This may be achieved with a small set of pre-defined entry points that may be specified using special assembly language labels. For kernel processes the recognized entry points are _halt, _boot, _init, _shutdown and _exec. For user processes the recognized entry points are _halt, _init, _start, and _final. The parallel execution of threads within the RPU may require locking and synchronization. For this purpose hardware mutexes (mutually exclusive locks) can be created as needed and used for locking and synchronization of resources. The operation mode of the RPU provides coarse-grained control over which types of processing cores have access to a particular resource. Fine-grained control may be provided through the binding of resources either statically or dynamically via mutexes to a specific processing core or threads contained within a process. Kernel processing cores differ from user processing cores in the access and control over resources. Kernel process cores have control over the operational mode of the RPU and can voluntarily relinquish access to certain resources by forcing the RPU out of kmode operation. Kernel mode processes may retake control and thus preempt user mode processes and certain interface access. Kernel mode processes may have privileged access to process registers and may be responsible for forcing the execution of user mode processes. Kernel processing cores are instantiated and programmed using the same RP Assembly specification that is used for user application processing cores.

One or more of the methods and systems of reconfigurable systems described above in this application may provide one or more of the following advantages: a) reduces or removes the requirement that developers learn a variant of the C language for efficiently using reconfigurable systems, b) better supports the full expression of the C language, for example including support for pointers, c) multi-programming features can be supported, d) the board is shared in a manner that is common to other system resources and the operating system is involved in the management of the board e) the disclosure avoids the use of GUI tools, consistent with the traditional approach of developers in High Performance Computing, f) the disclosure does not require a specific orchestration of data movement between host and reconfigurable asset. Some implementations can be used advantageously to achieve performance acceleration while making the development process manageable and less onerous for those not familiar with hardware design.

The described systems, methods, and techniques may be implemented in digital electronic circuitry, computer hardware, firmware, software, or in combinations of these elements. Apparatuses embodying these techniques may include appropriate input and output devices, a computer processor, and a computer program product tangibly embodied in a machine-readable storage device for execution by a programmable processor.

Various modifications may be made. For example, useful results still may be achieved if steps of the disclosed techniques are performed in a different order and/or if components in the disclosed systems are combined in a different manner and/or replaced or supplemented by other components.

What is claimed is:

1. A reconfigurable computing system for enabling high performance computing, comprising:
   a host platform running an operating system (OS);
   a reconfigurable processing kernel module;
   a plurality of drivers interacting with the OS;
   one or more reconfigurable hardware modules;
   a software stack interacting with the OS and providing access to the reconfigurable hardware, wherein the reconfigurable processing kernel module manages reconfigurable processes and coordinates data transfer to and from host, and wherein the reconfigurable processing kernel modifies the OS to utilize the software stack, enabling the use of reconfigurable hardware modules through the use of hardware specific driver instructions; and
   an application compiler that segments source code of an application into first code for the host platform and second code for the one or more reconfigurable hardware modules, compiles the first code for the host platform into a binary file, compiles the second code for the one or more reconfigurable hardware modules into a bitstream file, and links the binary file and the bitstream file into an executable file for the application.

2. The system of claim 1, wherein the OS is a version of Free BSD.

3. The system of claim 1, wherein the software stack comprises one or more of system calls, C APIs, and utility commands.

4. The system of claim 1, wherein the reconfigurable hardware is in the form of a co-processing board.

5. The system of claim 4, wherein the co-processing board is comprised of:
   a reconfigurable processor;
   a memory component;
   a general processing unit; and
   component links.

6. The system of claim 5, wherein the reconfigurable processor is a field programmable gate array.

7. The system of claim 1, wherein the application compiler parses high level language source code for the application, re-authors first high level language source code for the host platform, and re-authors second high level language source code for the one or more reconfigurable hardware modules.

8. The system of claim 1, wherein the application compiler passes the first code targeting the host platform through a first compilation stage and a first assembler stage, and the application compiler passes high level language code targeting the one or more reconfigurable hardware modules through a second compilation stage and a second assembler stage, the second compilation stage being different than the first compilation stage and the second assembler stage being different than the second compilation stage.

9. The system of claim 1, wherein the application uses a segmentation language to express requirements for segmentation of code between the host platform and the one or more reconfigurable hardware modules and the application compiler interprets the segmentation language and produces a first instantiation targeting the host platform and a second instantiation targeting the one or more reconfigurable hardware modules, the first instantiation targeting the host platform being separate from the second instantiation targeting the one or more reconfigurable hardware modules.

10. The system of claim 9, wherein the application conforms to standards of a programming language and allows compilation of the source code including the segmentation language by standard compilers that do not target reconfigurable resources to a standard executable that runs only on the host platform.

11. The system of claim 1, wherein the application compiler converts high level language source code for the application into low level language source code and converts the low level language source code into a bitstream that is able to target and program the one or more reconfigurable hardware modules.

12. The system of claim 1, wherein the application compiler converts high level language source code for the application into assembly language, converts the assembly language into hardware description language, and converts the hardware description language into a bitstream.

13. The system of claim 1, wherein the one or more reconfigurable hardware modules offer configurability that includes declaration of hardware mutexes, static configuration of memory channels, and static resource binding.

14. The system of claim 1, wherein the one or more reconfigurable hardware modules allow data storage classes.

15. The system of claim 1, wherein the reconfigurable processing kernel module instantiates a local word-sized register-like data object arbitrarily within logic of at least one of the one or more reconfigurable hardware modules and the local word-sized register-like data object is used by a local processing element.

16. The system of claim 1:
wherein the one or more reconfigurable hardware modules comprise one or more reconfigurable processing cores that enable flexible designation of registers, memory controllers, interfacing, and operational modes and that provide targets for an assembly compiler that is part of the application compiler, and
wherein the assembly compiler translates an intermediate assembly language into a hardware descriptive language and fuses the targeted one or more reconfigurable processing cores and user logic into one functional unit.

17. The system of claim 1, wherein user applications access the reconfigurable processing kernel module through system calls that are linked into executable code as a result of the application compiler accessing a reconfigurable processing library.

18. A method for reconfigurable computing that enables high performance computing, comprising:
running an operating system (OS) that is located on a host platform and which is modified by a reconfigurable processing kernel module;
supporting a plurality of reconfigurable hardware units through the use of one or more drivers interacting with the reconfigurable processing kernel module;
accessing the reconfigurable hardware through the reconfigurable processing kernel module via a software stack;
managing reconfigurable processes and coordinating data transfer to and from the host using the reconfigurable processing kernel; and
using an application compiler to segment source code of an application into first code for the host platform and second code for the plurality of reconfigurable hardware units, compile the first code for the host platform into a binary file, compile the second code for the plurality of reconfigurable hardware units into a bitstream file, and link the binary file and the bitstream file into an executable file for the application.

19. The method of claim 18, wherein running the host OS, modified with the reconfigurable processor kernel module, achieves access to and control of reconfigurable processes.

20. The method of system 18, wherein the reconfigurable processing unit is in the form of one or more co-processing boards.

21. The method of claim 18, wherein the drivers differentiate between one or more reconfigurable hardware units.

22. The method of claim 18, wherein the reconfigurable processing unit comprises at least one of the following components:
one or more field programmable gate arrays,
one or more DSPs,
one or more general processing units, and
one or more memory banks.

23. The method of claim 18, wherein using the application compiler comprises using the application compiler to parse high level language source code for the application, re-author first high level language source code for the host platform, and re-author second high level language source code for the plurality of reconfigurable hardware units.

24. The method of claim 18, wherein using the application compiler comprises passing the first code targeting the host platform through a first compilation stage and a first assembler stage, and passing high level language code targeting the plurality of reconfigurable hardware units through a second compilation stage and a second assembler stage, the second compilation stage being different than the first compilation stage and the second assembler stage being different than the second compilation stage.

25. The method of claim 18, wherein the application uses a segmentation language to express requirements for segmentation of code between the host platform and the plurality of reconfigurable hardware units and using the application compiler comprises interpreting the segmentation language and producing a first instantiation targeting the host platform and a second instantiation targeting the plurality of reconfigurable hardware units, the first instantiation targeting the host platform being separate from the second instantiation targeting the plurality of reconfigurable hardware units.

26. The method of claim 25, wherein the application conforms to standards of a programming language and allows compilation of the source code including the segmentation language by standard compilers that do not target reconfigurable resources to a standard executable that runs only on the host platform.

27. The method of claim 18, wherein using the application compiler comprises converting high level language source code for the application into low level language source code and converting the low level language source code into a bitstream that is able to target and program the plurality of reconfigurable hardware units.

28. The method of claim 18, wherein using the application compiler comprises converting high level language source code for the application into assembly language, converting the assembly language into hardware description language, and converting the hardware description language into a bitstream.

29. The method of claim 18, wherein the plurality of reconfigurable hardware units offer configurability that includes declaration of hardware mutexes, static configuration of memory channels, and static resource binding.

30. The method of claim 18, wherein the plurality of reconfigurable hardware units allow data storage classes.

31. The method of claim 18, wherein the reconfigurable processing kernel module instantiates a local word-sized register-like data object arbitrarily within logic of at least one of the plurality of reconfigurable hardware units and the local word-sized register-like data object is used by a local processing element.

32. The method of claim 18:
wherein the plurality of reconfigurable hardware units comprise one or more reconfigurable processing cores that enable flexible designation of registers, memory controllers, interfacing, and operational modes and that provide targets for an assembly compiler that is part of the application compiler, and
wherein using the application compiler comprises using the assembly compiler to translate an intermediate assembly language into a hardware descriptive language and to fuse the targeted one or more reconfigurable processing cores and user logic into one functional unit.

33. The method of claim 18, further comprising enabling user applications to access the reconfigurable processing kernel module through system calls that are linked into executable code as a result of the application compiler accessing a reconfigurable processing library.

* * * * *